(12) United States Patent
Boicu

(10) Patent No.: US 11,057,513 B2
(45) Date of Patent: Jul. 6, 2021

(54) SYSTEM AND METHOD FOR CONTROLLING ELECTRONIC DEVICE USAGE AT A PLACE OF EMPLOYMENT

(71) Applicant: Dorel Boicu, Dacula, GA (US)

(72) Inventor: Dorel Boicu, Dacula, GA (US)

(*) Notice: Subject to any disclaimer, the term of this patent is extended or adjusted under 35 U.S.C. 154(b) by 0 days.

(21) Appl. No.: 15/944,183

(22) Filed: Apr. 3, 2018

(65) Prior Publication Data

US 2018/0295230 A1 Oct. 11, 2018

Related U.S. Application Data

(60) Provisional application No. 62/481,801, filed on Apr. 5, 2017, provisional application No. 62/531,020, filed on Jul. 11, 2017.

(51) Int. Cl.
| H04M 1/72463 | (2021.01) |
| H04W 4/029 | (2018.01) |
| H04W 48/04 | (2009.01) |
| H04M 1/72457 | (2021.01) |

(52) U.S. Cl.
CPC ... *H04M 1/72463* (2021.01); *H04M 1/72457* (2021.01); *H04W 4/029* (2018.02); *H04W 48/04* (2013.01)

(58) Field of Classification Search
CPC ............. H04W 4/029; H04M 1/72463
See application file for complete search history.

(56) References Cited

U.S. PATENT DOCUMENTS

| 7,505,730 | B2 | 3/2009 | Huang |
| 8,315,617 | B2 | 11/2012 | Tadayon |
| 8,543,053 | B1 | 9/2013 | Melamed |
| 8,630,612 | B1 | 1/2014 | Baker |
| 8,805,281 | B2 | 8/2014 | Hsu |
| 8,989,779 | B1 | 3/2015 | Centore, III |
| 9,325,836 | B2 | 4/2016 | Cerda |
| 9,357,053 | B2 | 5/2016 | Gruberman |
| 2012/0233044 | A1* | 9/2012 | Burger ............ G06Q 10/06 705/32 |
| 2013/0040629 | A1 | 2/2013 | Sprigg |
| 2013/0210406 | A1* | 8/2013 | Vidal ............ H04W 4/40 455/418 |
| 2015/0262112 | A1* | 9/2015 | Raanan ........ G06Q 10/063114 705/7.15 |
| 2016/0050309 | A1 | 2/2016 | Gooberman |

* cited by examiner

*Primary Examiner* — Hsinchun Liao
(74) *Attorney, Agent, or Firm* — Gutwein Law; Greg Geiser

(57) ABSTRACT

Described herein is a system and method adapted for use on a personal electronic device, such as a smart phone, for generally monitoring the use of the personal electronic device by an employee by an employer. The system and method generally functions as a time clock and enables the employee to clock in and clock out. Further, the system and method allows the employee to clock out to view items that are restricted by a monitoring system.

20 Claims, 2 Drawing Sheets

US 11,057,513 B2

SYSTEM AND METHOD FOR CONTROLLING ELECTRONIC DEVICE USAGE AT A PLACE OF EMPLOYMENT

CROSS REFERENCE TO RELATED APPLICATIONS

This application claims priority to United States Provisional Patent Application Nos. 62/481,801 filed 5 Apr. 2017 and 62/531,020 filed 11 Jul. 2017 to the above named inventor, and are herein incorporated by reference in their entirety.

FIELD OF THE INVENTION

The invention relates generally to an application system and method hosted on a personal electronic device to generally monitor and control a user's personal electronic device use during a given time period and at a given location.

BACKGROUND

Keeping track of employee's time during employment is often a task that relies on employee's to "clock-in" and "clock-out" at the time of beginning and ending work for a given shift. Traditionally, this was accomplished through a punch card and time clock. More recently, this task is accomplished electronically through badges and identification cards, wherein a magnetic strip or chip member with identifying information is generally swiped though or passed by a card reader for indicating the presence of an employee.

In addition to general time keeping, it is becoming more common for employees to use their personal electronic devices for non work related tasks throughout the work day. This use is often conducted while the employee is "on the clock" and generally results in a decrease in productivity and a potential waste in employee time and productivity.

Therefore, these is a need for a system and method to track a given employee's personal electronic device usage. Preferably this system and method and its use increased employee productivity, was adapted for customization by an employer, utilized device hardware components to enable location based features, and allowed for automated clocking in and clocking out for given work tasks.

SUMMARY OF THE INVENTION

The present disclosure provides a system and method to generally control and track an employee's personal electronic (smart phone) use during work hours, at a jobsite, and at a given work location. Accordingly, the system and method is generally installed as a software application onto the electronic device and wherein the system and method utilizes the various electronic components, including hardware items, and communicative features to enable the various aspects of the system and method.

The system and method generally enables a business owner or employer to keep track of their employee's cell phone usage while on the job. Accordingly, the system and method is generally adapted for installation on a device of an employee wherein various functions and usage of the device are monitored and may be restricted. The system and method enables the employer to select which features and functions are enabled and disabled or be notified when given features and functions are utilized or attempted to be utilized, wherein the employer may limit or restrict use of certain applications, web addresses, or hardware items, such as cellular antennas, or be notified when certain applications or web addresses are visited.

The system and method of the present disclosure further includes automated features wherein the operation may be based upon proximity to a work location or presence within a work location. Accordingly, the system and method may utilize location based features of a personal electronic device, including, but not limited to, global positioning satellite locators, radio signal multilateration, or Wi-Fi positioning.

The initiation or cessation of the system and method on a given device may additionally be in communication with additional system and methods related to various tasks of the employee, including but not limited to, point of sale (POS) systems, scheduling programs, and additional time keeping programs.

The present disclosure now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
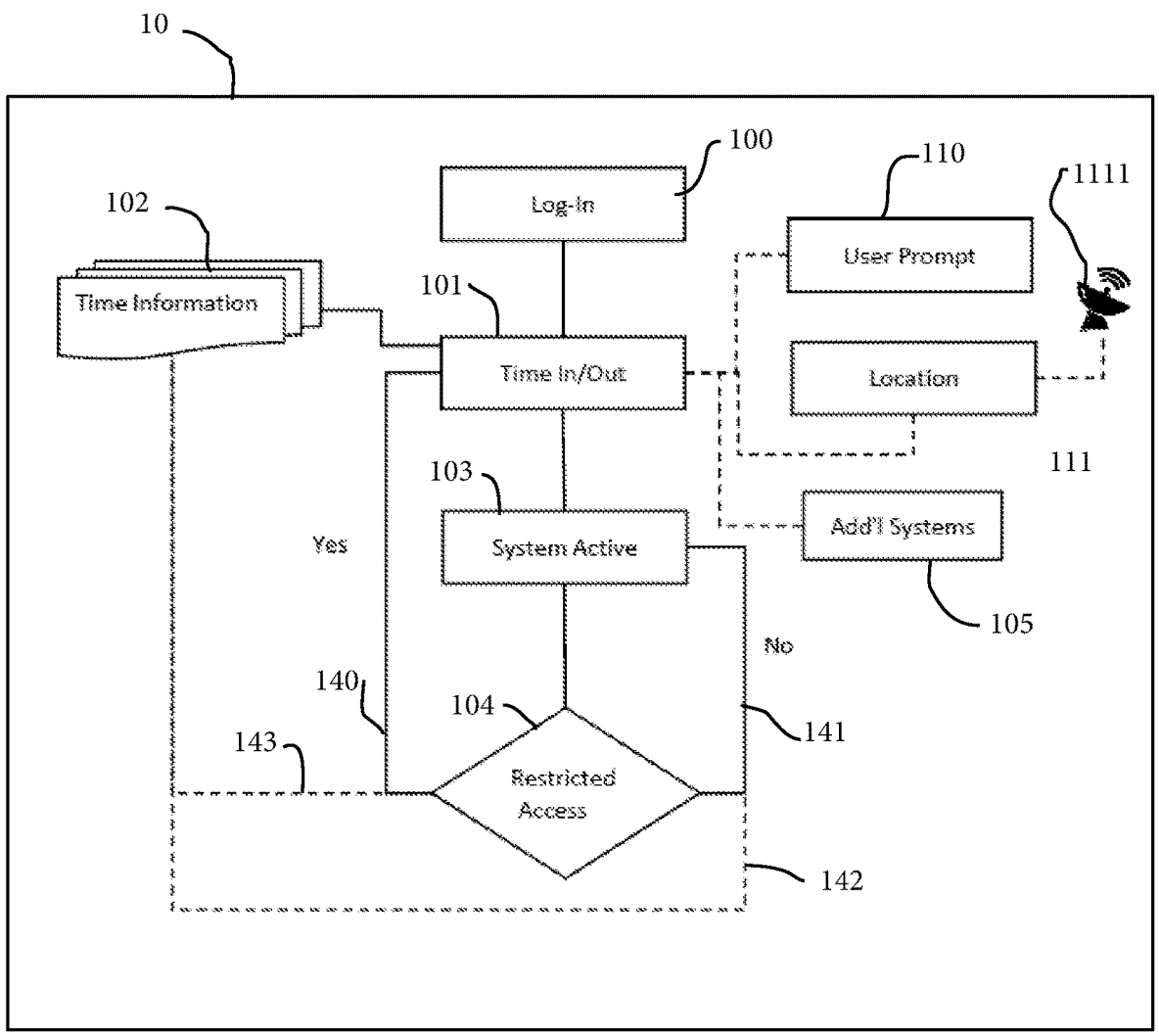
FIG. 1 shows a wireframe diagram of the system and method, according to the present disclosure.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention is directed to be an application hosted on a personal electronic device, such as a smart phone, and adapted to monitor and potentially restrict an employee's usage of the device during business/work hours or at the location of employee's employment.

Accordingly the system and method generally allows employers to track and restrict certain phone applications and features during a given time period or at a given location.

Figure 2:
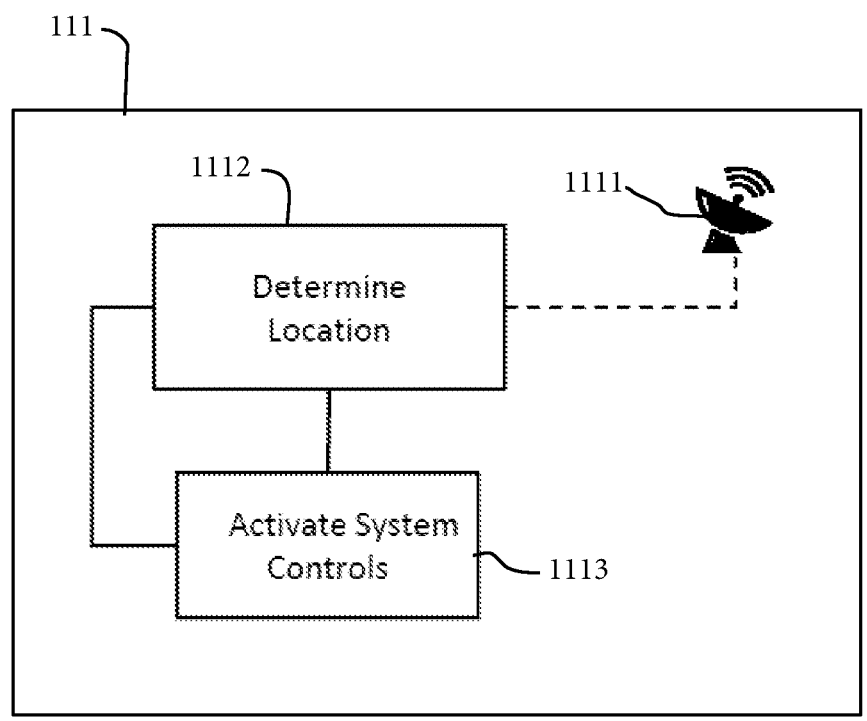
FIG. 2 shows a wireframe diagram of the location based feature of the system and method, according to the present disclosure.

Referring to the figures, FIGS. 1-2 show wireframe diagrams of the system and method according to the present disclosure, generally referred to as system 10. The system 10 is generally provided in an application on a personal electronic device, such as a smart phone, and coupled to the various hardware and communicative features of the personal electronic device. The personal electronic device having a processor and acting as a controller for the system 10. The system 10 is preferably adapted for installation on a standard smart phone, such as a cellular phone, and designed to allow an employer to monitor, warn, and restrict an employee's personal electronic device usage during a given working shift.

The system 10 and method for use is generally initiated by a user through an initial log-in at process 100, wherein a user, typically in the form of an employee, generally creates a profile or is provided a profile by employer associated with a given employee and user account with their identification information, including but not limited, name, position, employee ID number, email address, and other relevant employment related characteristics and information. Accordingly, at this log-in the user will generally form an account linked to these identifying characteristics through the creation of a user identification ("user id") device and a unique password associated with the user id.

Associated with a given account 100, an employer is enabled to select which features, functions, programs, and applications are allowed for operation or restricted on the device the system 10 is installed upon. Accordingly, an employer may allow, limit, or restrict the use of certain applications, web addresses, or hardware items, such as cellular antennas, or be notified when certain applications or web addresses are visited.

After creation of the initial account and log-in 100, a user and their employer, in the form of a monitor, are then able to utilize the system for various employment related functions. Likely the most common function is logging the employee's time through a time in or clock in and time out of clock out function 101. The time in/out system 101 is adapted for two types of prompts available to a user. In a first prompt 110 a user of the system 10 can manually clock in or clock out upon the beginning or ending of a work shift or task by recording the day, date, and time of activation. Accordingly, a user will select an icon in the form of a button to start the time clock or stop the time clock.

Alternately, the system and method 10 enables a second prompt 111, wherein a user of the system 10 is automatically clocked in or clocked out depending upon the location of the device the system is used upon, wherein the day, date, and time of entry or exit from the location is recorded. The second prompt 111 is coupled to the location based hardware items of the device, wherein a positioning device 1111 is utilized to determine the location of the device and employee. Accordingly, (FIG. 2) backend processes are necessary to enable the system to understand that the location is a place of employment for the user, wherein the employer will utilize administrative features of the system 10 and method to determine the location of employment 1112. This feature may utilize a geofence to develop a virtual boundary around the work location and utilize communicative features, such as, but not limited to, global positioning satellite locators ("GPS"), radio signal multilateration, Wi-Fi positioning, radio frequency identification ("RFID"), near field communication ("NFC"), or other similar communicative protocol or device to determine the location 1112 of the device the system 10 and method is operating upon. After confirming the location 1112 of the device and presence of the employee at a place of employment, the system 10 and its controls are activated 1113.

The system 10 and method stores all of the associated data in a data system 102 related to the clock in and clocking out 101 of employee to be viewed by both the employee and employer. This data and information in the form of events stored in by the data system 102, the events including, but not limited to, the date, the time of clocking in and clocking out, amount of hours worked, employee identification information, applications used, sites visited, sites attempted to visit, application time in use, and other similar data generating events. This data and information 102 can be displayed in multiple tables, charts, graphs, of informational and helpful configurations. Further, the amount and type of information seen can depend upon privileges granted and type of user, wherein an employer or administrator has access to different information than an employee.

After the employee has clocked in 101, either manually 110 or based upon their location 111, the system 10 is active and functioning as a monitoring system 103 tracking and monitoring the use of the employee's device the system 10 is operating upon.

As the user/employee is using the device the system 10 and method is operating on and while logged-in 101, either manually 110 or based upon location 111, use by a user is monitored 103 and logged 102. Upon attempting to access a restricted/blocked application or navigating to a restricted/blocked website or feature on a device the system 10 is operating upon, the employee/user is notified 104 through a warning and a decision step 104 enabled. At this step of the system and method 104 the user is able to decide to clock out 140 to view or utilize the restricted application, upon which this event 143 will be logged 102. Alternately, the user may decide 104 not to visit the restricted application, function, feature, or website, wherein they will remain clocked in and the system continuing to remain active 103. Accordingly, this attempt 142 will be logged 102.

The system 10 and method as it is operated on the device of the employee at log in 100 and upon clock in 101 may additionally be communicatively coupled to additional systems related to various tasks of the employee, including but not limited to, point of sale (POS) systems, scheduling programs, and additional time keeping programs.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A system in the form of an application installed on a personal electronic device of an employee for actively restricting certain use of the personal electronic device of the employee with the employee functioning as a user at a work location by an employer, the system comprising:
    a time-in, time-out system, the time-in, time-out system capable of recording a day, a date, and a time upon an activation of the application;
    a monitoring system, the monitoring system communicatively coupled to the time-in, time-out system and initiated upon activation of the time-in, time-out system, the monitoring system monitoring employee use of the personal electronic device of the employee and capable of a detection of a restricted use of the personal electronic device of the employee;
    the restricted use selected by the employer, wherein the employer may select which features, functions, programs, and applications are allowed for operation or restricted on the employee personal electronic device;
    a notification system, the notification system communicatively coupled to the monitoring system, the notification system alerting the user upon the detection of the restricted use that continued use of the personal electronic device is restricted as a result of the detected restricted use; and
    a decision step, the decision step operably coupled to the notification system and the time-in, time-out system, wherein the user is alternately able to exit the system upon the detection of the restricted use and continue to the restricted use after enabling the time-in, time-out system or continue use of the system without continuing to the restricted use.

2. The system of claim 1, wherein the time-in, time-out system is activated manually by the user.

3. The system of claim 1, wherein the time-in, time-out system is activated based upon a location of the device corresponding to a place of employment of the user.

4. The system of claim 3, wherein the system uses a global positioning antenna of the personal electronic device.

5. The system of claim 1, wherein the system includes a data system, the data system coupled to the time-in, time-out system and capable of storing event data.

6. The system of claim 1, wherein the system includes additional systems, the additional systems coupled to the time-in, time-out system, wherein the additional systems are related to the user's employment.

7. The system of claim 6, wherein the additional system is a point of sale system.

8. A system for use as an application on a personal electronic device of an employee, the system actively restricting certain uses of the personal electronic device of the employee by an employer, the system comprising:
    the personal electronic device, the personal electronic device being a controller in operable communication with the system;
    a time-in, time-out system, the time-in, time-out system capable of recording a day, a date, and a time upon an activation;
    a monitoring system, the monitoring system communicatively coupled to the time-in, time-out system and initiated upon activation of the time-in, time-out system, the monitoring system monitoring employee use of the device and capable of detecting a restricted use of the device by the employee;
    the restricted use selected by the employer, wherein the employer may select which features, functions, programs, and applications are allowed for operation or restricted on the employee personal electronic device;
    a notification system, the notification system communicatively coupled to the monitoring system, the notification system alerting the employee upon detection of the restricted use by the monitoring system that continued use of the device is restricted; and
    a decision step, the decision step operably coupled to the notification system and the time-in, time-out system, wherein the employee is alternately able to exit the system upon the detection of the restricted use and continue to the restricted use after enabling the time-in, time-out system or continue use of the system without continuing to the restricted use.

9. The system of claim 8, wherein the time-in, time-out system is activated manually by the employee.

10. The system of claim 8, wherein the time-in, time-out system is activated based upon a location of the device corresponding to a place of employment of the employee.

11. The system of claim 10, wherein the system uses a global positioning antenna of the personal electronic device.

12. The system of claim 8, wherein the system includes a data system, the data system coupled to the time-in, time-out system and capable of storing event data.

13. The system of claim 8, wherein the system includes additional systems, the additional systems coupled to the time-in, time-out system, wherein the additional systems are related to the employee's employment.

14. The system of claim 13, wherein the additional system is a point of sale system.

15. A method for monitoring the use of a personal electronic device of an employee by an employer, the method actively restricting certain uses of the personal electronic device of the employee, the method comprising:
the personal electronic device of the employee, the personal electronic device being a controller in operable communication with the method;
a time-in, time-out system, the time-in, time-out system capable of recording a day, a date, and a time upon an activation;
a monitoring system, the monitoring system communicatively coupled to the time-in, time-out system and initiated upon activation of the time-in, time-out system, the monitoring system monitoring use of the personal electronic device of the employee and capable of detecting a restricted use of the personal electronic device of the employee;
the restricted use selected by the employer, wherein the employer may select which features, functions, programs, and applications are allowed for operation or restricted on the employee personal electronic device;
a notification system, the notification system communicatively coupled to the monitoring system, the notification system alerting the employee upon detection of the restricted use by the monitoring system that continued use of the personal electronic use is restricted as a result of the detection of the restricted use; and
a decision step, the decision step operably coupled to the notification system and the time-in, time-out system, wherein the employee is alternately able to exit the system upon the detection of the restricted use and continue to the restricted use after enabling the time-in, time-out system or continue use of the system without continuing to the restricted use.

16. The method of claim 15, wherein the time-in, time-out system is activated based upon a location of the device corresponding to a place of employment of the employee.

17. The method of claim 15, wherein the system includes a data system, the data system coupled to the time-in, time-out system and capable of storing event data.

18. The method of claim 15, wherein the system includes additional systems, the additional systems coupled to the time-in, time-out system, wherein the additional systems are related to the employee's employment.

19. The method of claim 18, wherein the additional system is a point of sale system.

20. The method of claim 15, wherein the system uses a global positioning antenna of the personal electronic device.

* * * * *